(12) United States Patent
Watanabe et al.

(10) Patent No.: US 10,704,403 B2
(45) Date of Patent: Jul. 7, 2020

(54) WASTEGATE SEALING JIG (71) Applicant: HONDA MOTOR CO., LTD., Tokyo (JP)

(72) Inventors: Yasuo Watanabe, Tochigi (JP); Soichiro Takahashi, Tochigi (JP); Tomoki Kiyooka, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 79 days.

(21) Appl. No.: 16/180,159

(22) Filed: Nov. 5, 2018

(65) Prior Publication Data

US 2019/0136706 A1 May 9, 2019

(30) Foreign Application Priority Data

Nov. 8, 2017 (JP) ................. 2017-215965

(51) Int. Cl.
*F01D 11/00* (2006.01)
*F02B 37/18* (2006.01)
*F02C 6/12* (2006.01)
*G01M 3/02* (2006.01)

(52) U.S. Cl.
CPC .......... *F01D 11/003* (2013.01); *F02B 37/183* (2013.01); *F02C 6/12* (2013.01); *F05D 2220/40* (2013.01); *F05D 2240/55* (2013.01); *F05D 2260/83* (2013.01); *G01M 3/025* (2013.01)

(58) Field of Classification Search
CPC ........ F01D 11/003; F01D 17/105; F02C 6/12; F02B 37/183; G01M 3/025; F05D 2220/40; F05D 2240/55; F05D 2260/83
See application file for complete search history.

(56) References Cited

U.S. PATENT DOCUMENTS

| 4,245,953 | A * | 1/1981 | Milton | F01D 17/105 415/144 |
| 7,644,583 | B2 * | 1/2010 | Leavesley | F02B 37/18 415/156 |
| 10,024,184 | B2 * | 7/2018 | Kennedy | F02B 37/24 |
| 2013/0287552 | A1 * | 10/2013 | House | F01D 11/003 415/170.1 |
| 2014/0072412 | A1 * | 3/2014 | Marques | F01D 17/10 415/144 |
| 2015/0097345 | A1 * | 4/2015 | House | F02B 37/186 277/585 |
| 2018/0023462 | A1 * | 1/2018 | Hahn | F02B 37/186 60/602 |

FOREIGN PATENT DOCUMENTS

JP S56-63233 5/1981

* cited by examiner

*Primary Examiner* — Igor Kershteyn
(74) *Attorney, Agent, or Firm* — Rankin, Hill & Clark LLP (57) ABSTRACT

A wastegate sealing jig (13) includes a base (14) which is fixable to an exhaust portion (11) of a turbocharger (1), the base (14) including a wastegate valve (6), and a turbine hole (12) which discharges exhaust gas in a turbine chamber (4b), a protrusion (15) which is provided in the base (14) so as to extend toward the exhaust portion (11), a valve member (16) which is attached to a distal end of the protrusion (15). The wastegate (5) is closed by the valve member (16) by inserting the valve member (16) between the wastegate (5) and the wastegate valve (6) of the turbocharger (1) in a state in which the wastegate valve (6) is opened.

8 Claims, 14 Drawing Sheets

WASTEGATE SEALING JIG

BACKGROUND OF THE INVENTION

Field of the Invention

The present invention relates to a wastegate sealing jig for sealing a wastegate during a leak test with an exhaust turbine turbocharger.

Description of the Related Art

There has been conventionally known a leak test for inspecting the leakage of intake and exhaust gas or engine oil in an internal combustion engine (for example, see Japanese Patent Laid-Open No. S56-63233).

In the internal combustion engine with an exhaust turbine turbocharger, it is inspected whether the intake and exhaust gas or the engine oil is leaked due to assembly defects. At this time, the leak test is conducted with the internal combustion engine itself with an exhaust turbine turbocharger without providing the catalyst and the muffler, or the like, and therefore the inspection is conducted with all openings such as an intake opening and an exhaust opening in the intern combustion engine with the exhaust turbine turbocharger being sealed.

In a leak test with an internal combustion engine with an exhaust turbine turbocharger, a small amount of leakage occurs from a gap between an opening and closing rotation shaft which opens and closes a wastegate valve of the exhaust turbine turbocharger and a through-hole which passes through the opening and closing rotation shaft, even if the exhaust opening is sealed, causing a problem in that the leak test cannot be conducted with high precision.

Then, it is proposed that this gap is closed by a sealing jig from the outside of the exhaust turbine turbocharger during the leak test, but it may be difficult to close the gap of the through-hole using the sealing jig from the outside of the exhaust turbine turbocharger because of the structure of the opening and closing rotation shaft.

In view of the above-described problem, it is therefore an object of the present invention to provide a wastegate sealing jig capable of properly sealing a wastegate.

SUMMARY OF THE INVENTION

[1] To achieve the above-described object, a wastegate sealing jig of the present invention (for example, a wastegate sealing jig 13 of an embodiment, the same applies hereinafter) includes:

a base (for example, a base 14 of the embodiment, the same applies hereinafter) which is fixable to an exhaust portion (for example, an exhaust portion 11 of the embodiment, the same applies hereinafter), which forms an exhaust opening (for example, an exhaust opening 10 of the embodiment, the same applies hereinafter) of a turbocharger (for example, a turbocharger 1 of the embodiment, the same applies hereinafter), the base includes a wastegate (for example, a wastegate 5 of the embodiment, the same applies hereinafter), a wastegate valve (for example, a wastegate valve 6 of the embodiment, the same applies hereinafter) capable of closing the wastegate by covering an open end on an exhaust side of the wastegate, an opening and closing rotation shaft (for example, an opening and closing rotation shaft 6a of the embodiment, the same applies hereinafter) which opens and closes the wastegate valve, and a turbine hole (for example, a turbine hole 12 of the embodiment, the same applies hereinafter) which discharges exhaust gas from a turbine chamber (for example, a turbine housing 4b of the embodiment, the same applies hereinafter) in which a turbine wheel (for example, a turbine wheel 4a of the embodiment, the same applies hereinafter) is housed, a protrusion (for example, a protrusion 15 of the embodiment, the same applies hereinafter) which is provided in the base so as to extend toward the exhaust portion in a region excluding the wastegate, a valve member (for example, a valve member 16 of the embodiment, the same applies hereinafter) which is attached to a distal end of the protrusion, wherein the wastegate is closed by the valve member by inserting the valve member between the wastegate and the wastegate valve of the turbocharger in a state in which the wastegate valve is opened.

According to the wastegate sealing jig according to the present invention, the wastegate is directly sealed by the valve member, thereby capable of appropriately suppressing the leakage from the gap between the wastegate and the opening and closing rotation shaft for opening and closing the wastegate valve.

[2] In the present invention, it is preferable that the valve member is configured to be turnable with respect to the base around an extending direction of the protrusion as a rotation axis line, and is formed to extend in a direction perpendicular to an axial direction of the protrusion and to increase a width of the valve member from a protrusion side to a distal end, in a state the valve member is turned to be inserted between the wastegate and the wastegate valve of the turbocharger, the wastegate is closed by the valve member.

According to the above configuration, the valve member is turned to directly seal the wastegate, thereby capable of appropriately suppressing the leakage from the gap between the wastegate and the opening and closing shaft for opening and closing the wastegate valve.

[3] In the present invention, it is preferable that the protrusion is configured to be retractable with respect to the base toward the exhaust opening. According to the above configuration, after the valve member is inserted into between the wastegate and the wastegate valve, the protrusion can press the valve member against the wastegate, thereby capable of firmly sealing the wastegate.

[4] In the present invention, it is preferable that a turbine hole (for example, a turbine hole 12 of the embodiment, the same applies hereinafter), which communicates with the turbine chamber in which the turbine is housed, is provided in the exhaust opening, and a turbine hole sealing member (for example, a turbine hole sealing member 17 of the embodiment, the same applies hereinafter) which seals the turbine hole is provided in the base.

It is also considered that the exhaust opening itself is sealed like in a conventional manner, but there is a possibility that a gap in a portion for operating the valve member needs to be sealed, therefore the structure becomes complicated.

As described above, the turbine hole sealing member is provided to directly seal the turbine hole, thereby capable of simplifying the structure of the wastegate sealing jig without closing the exhaust opening and sealing a gap in a portion for operating the valve member.

[5] In the present invention, it is preferable that the turbine hole sealing member is configured to be retractable with respect to the base toward the turbine hole, the valve member is configured to be turnable with respect to the base around an extending direction of the protrusion as a rotation axis line, the valve member is positioned in the distal end direction of the turbine hole sealing member when the turbine hole sealing member is at a retracted position, and to close the exhaust opening, the valve member is turned, and then the turbine hole sealing member is advanced to seal the turbine hole.

According to the above configuration, the protrusion is inserted into the exhaust opening in a state in which the valve member and the turbine hole sealing member overlap with each other, and even if the space in the exhaust opening is relatively narrow, the waste gate sealing jig of the present invention can be attached so that the wastegate is properly sealed.

[6] In the present invention, it is preferable that the base is configured so that the rotation axis line is positioned on a bisector of a line segment connecting an opening center on an exhaust side of the wastegate and an opening center on an exhaust side of the turbine hole when the base is fixed to the exhaust opening.

Here, if the base is not configured so that the rotation axis line is positioned on the bisector, there is the possibility that the wastegate cannot be covered even if the valve member positioned at the distal end of the turbine hole sealing member is turned unless the valve member is increased. However, it is assumed that excessively increasing the valve member makes it difficult to insert the wastegate sealing jig into the exhaust opening even if the valve member is positioned at the distal end of the turbine hole sealing member.

As described above, the base is configured so that the rotation axis line is positioned on the bisector, so that the wastegate can be firmly sealed even if the valve member is made necessary minimum.

[7] In the present invention, it is preferable that the valve member is configured so that a thickness thereof is gradually reduced with increasing distance from the rotation axis line, and the rotation axis line is positioned at an intersection point between a line segment (L2) which is perpendicular to an axis line of the opening and closing rotation shaft (for example, an opening and closing rotation shaft 6a of the embodiment, the same applies hereinafter) which swingably opens and closes the wastegate valve in a direction away from the wastegate, and which passes through the opening center on the exhaust side of the wastegate, and a line segment (L3) being perpendicular to the line segment (L2) passing through the opening center on the exhaust side of the wastegate, and passes through the opening center on the exhaust side of the turbine hole, when the base is fixed to the exhaust opening.

According to the above configuration, the turbine hole is sealed by the turbine hole sealing member in advance, thereby capable of preventing the rotation axis line of the valve member from being tilted due to a rotation reaction force when the valve member is turned.

[8] In the present invention, it is preferable that the valve member is configured to be slidable in a direction perpendicular to an extending direction of the protrusion, and the wastegate is sealed by the valve member in a state where the valve member is inserted between the wastegate and the wastegate valve of the turbocharger by sliding the valve member.

According to the above configuration, the valve member is slid to directly seal the wastegate, thereby capable of appropriately suppressing the leakage from the gap between the wastegate and the opening and closing rotation shaft for opening and closing the wastegate valve.

DETAILED DESCRIPTION OF THE PREFERRED EMBODIMENTS

Figure 1:
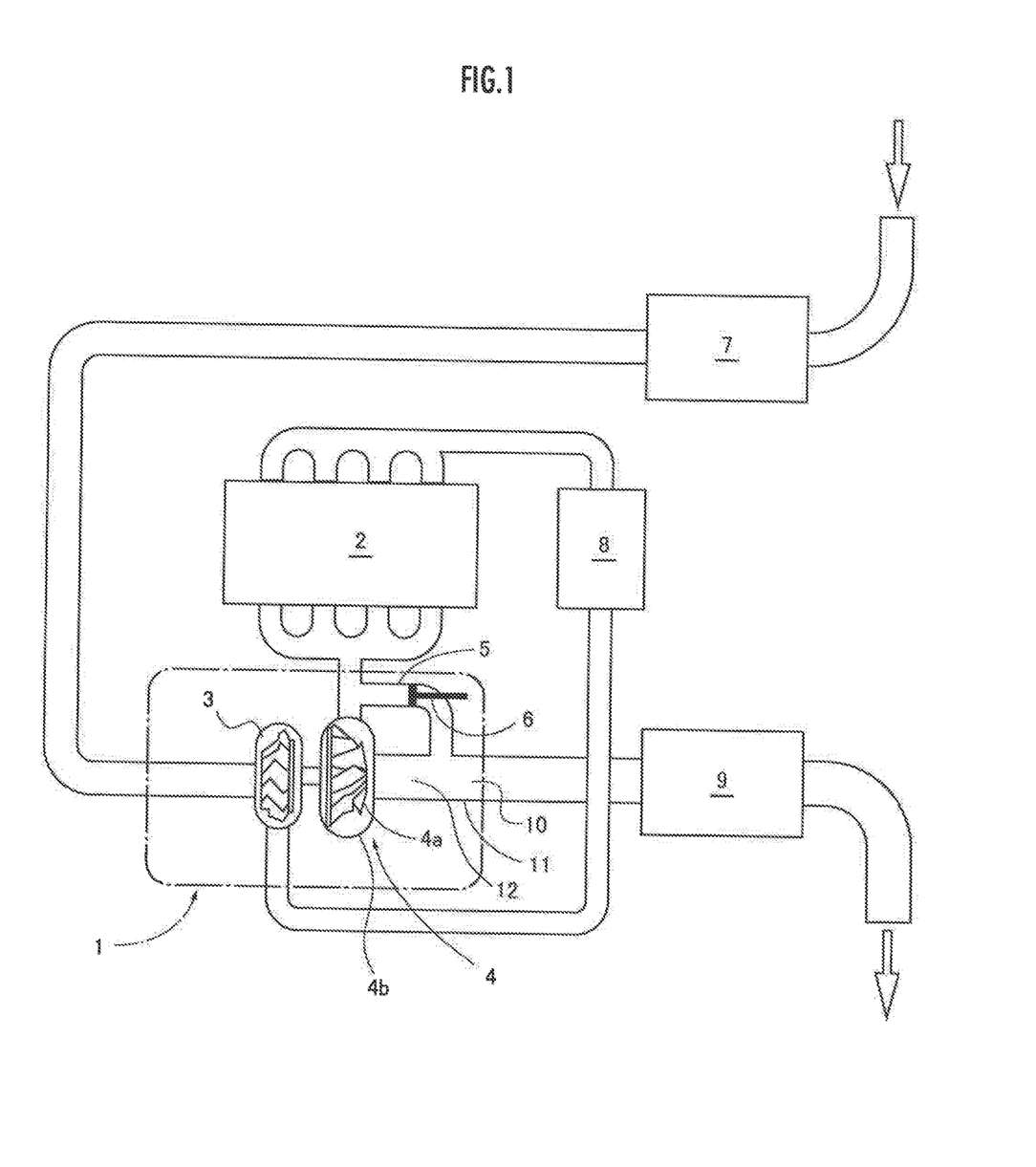
FIG. 1 is an explanatory diagram schematically illustrating an internal combustion engine including an exhaust turbine turbocharger to which a wastegate sealing jig of a first embodiment of the preset invention is applied.

Referring to FIG. 1, an exhaust turbine turbocharger 1 (turbocharger) for which a wastegate sealing jig of a first embodiment of the present invention is used is applied to, for example, a four-cylinder (the number of cylinders is not limited to four) internal combustion engine 2 (such as a gasoline engine and a diesel engine), and includes a compressor 3 which compresses intake air to the internal combustion engine 2, a turbine 4 which is rotated by exhaust from the internal combustion engine 2 to drive the compressor 3, and a wastegate 5 and a wastegate valve 6 which control an exhaust amount to be supplied to the turbine 4.

The wastegate valve 6 is fixed to a distal end of an opening and closing rotation shaft 6a, the distal end being bent in an L shape, and the opening and closing rotation shaft 6a is rotated to open or close an open end on the exhaust side of the wastegate 5.

The intake air which has flowed through an air cleaner 7 is compressed by the compressor 3 of the turbocharger 1, and the compressed intake air is cooled by an intercooler 8 and is supplied to the internal combustion engine 2. The exhaust discharged from the internal combustion engine 2 flows through the turbine 4 of the turbocharger 1, is discharged from the turbocharger 1, flows through a catalyst 9, and then is discharged. The wastegate 5 is a passage which leads the exhaust discharged from the internal combustion engine 2 to the catalyst 9 through the turbine 4, and the wastegate valve 6 controls an amount of the exhaust which flows through the wastegate 5.

Figure 2:
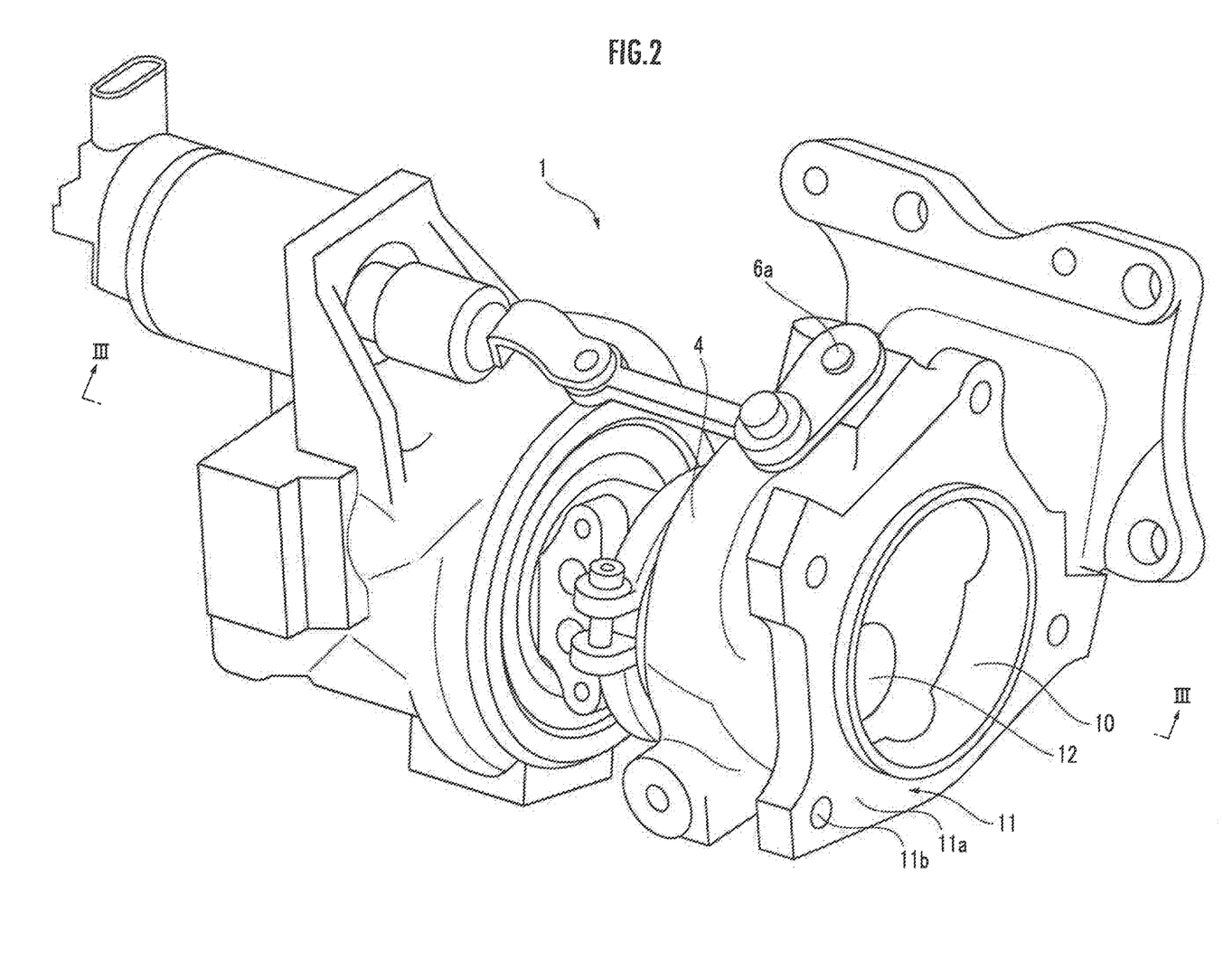
FIG. 2 is a perspective view illustrating the turbocharger of the first embodiment.
Figure 3:
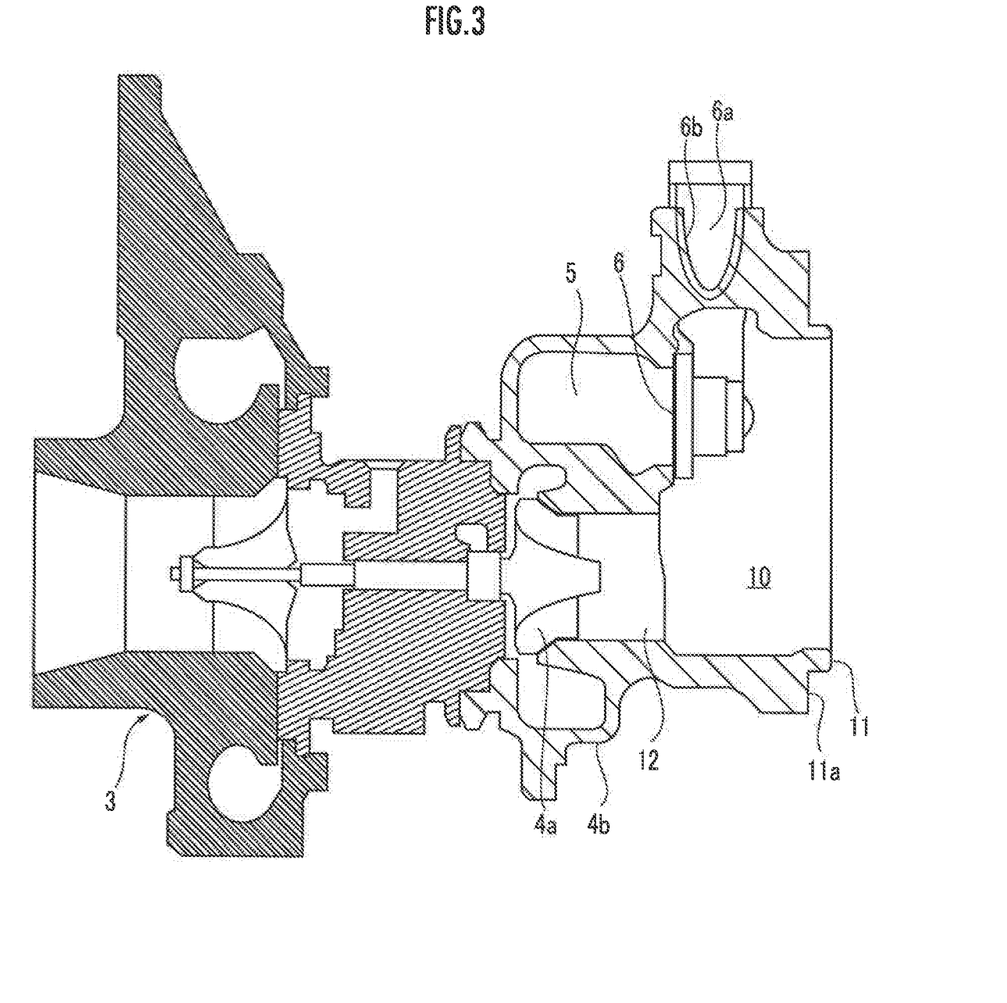
FIG. 3 is a cross-sectional view illustrating the turbocharger of the first embodiment.

FIG. 2 is a perspective view of the turbocharger 1 of the present embodiment. The turbocharger 1 is provided with an exhaust portion 11 forming an exhaust opening 10. FIG. 3 is a cross-sectional view of the turbocharger 1 of the present embodiment. As illustrated in FIG. 3, in the turbocharger 1, a turbine hole 12 and the wastegate 5 which communicate with a turbine housing 4*b* (turbine chamber) housing a turbine wheel 4*a* are open in the exhaust portion 11.

Figure 4:
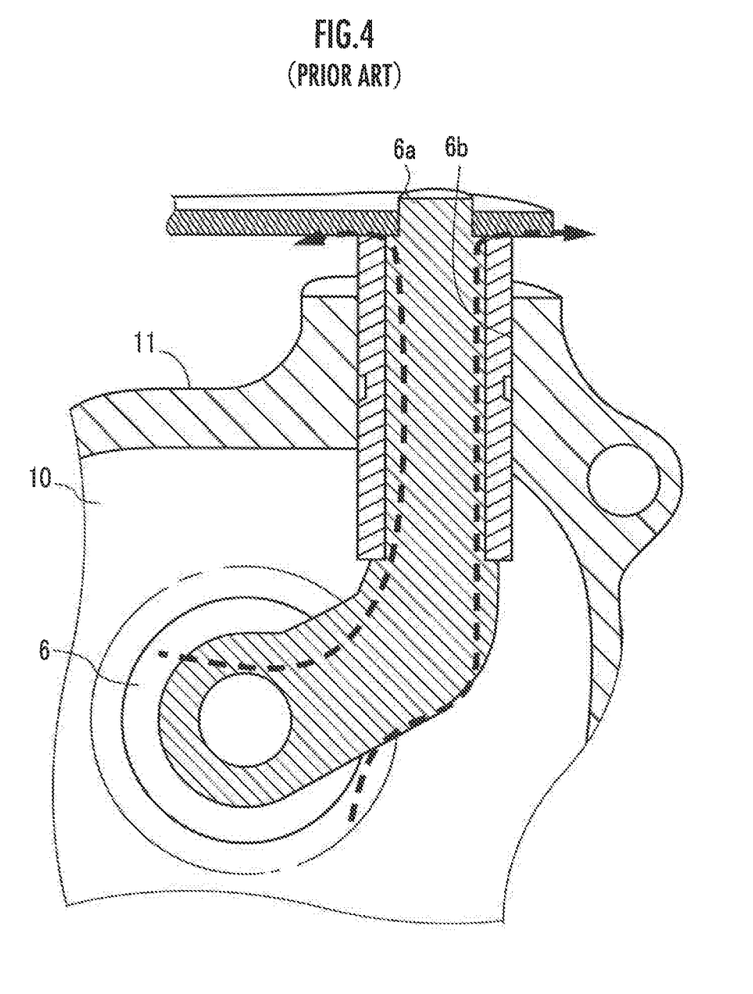
FIG. 4 is a cross-sectional view illustrating an opening and closing rotation shaft of a wastegate valve of the first embodiment.

The exhaust opening 10 of the exhaust portion 11 has been conventionally closed when the internal combustion engine 2 with turbocharger 1 of the present embodiment is subjected to the leak test. However, since as illustrated partially in cross section in FIG. 4 as the prior art, gas, oil, or the like leaks from a gap between the opening and closing rotation shaft 6*a* which opens and closes the waste gate valve 6 and a through-hole 6*b* which is provided in the exhaust portion 11 and into which the opening and closing rotation shaft 6*a* is inserted (see the dashed-line arrows in FIG. 4), this gap needs to be properly sealed during the leak test in addition to the closing of the exhaust opening 10. However, the shape of the opening and closing rotation shaft 6*a*, or the like may make it difficult to properly seal the gap between the opening and closing rotation shaft 6*a* and the through-hole 6*b*.

Figure 5:
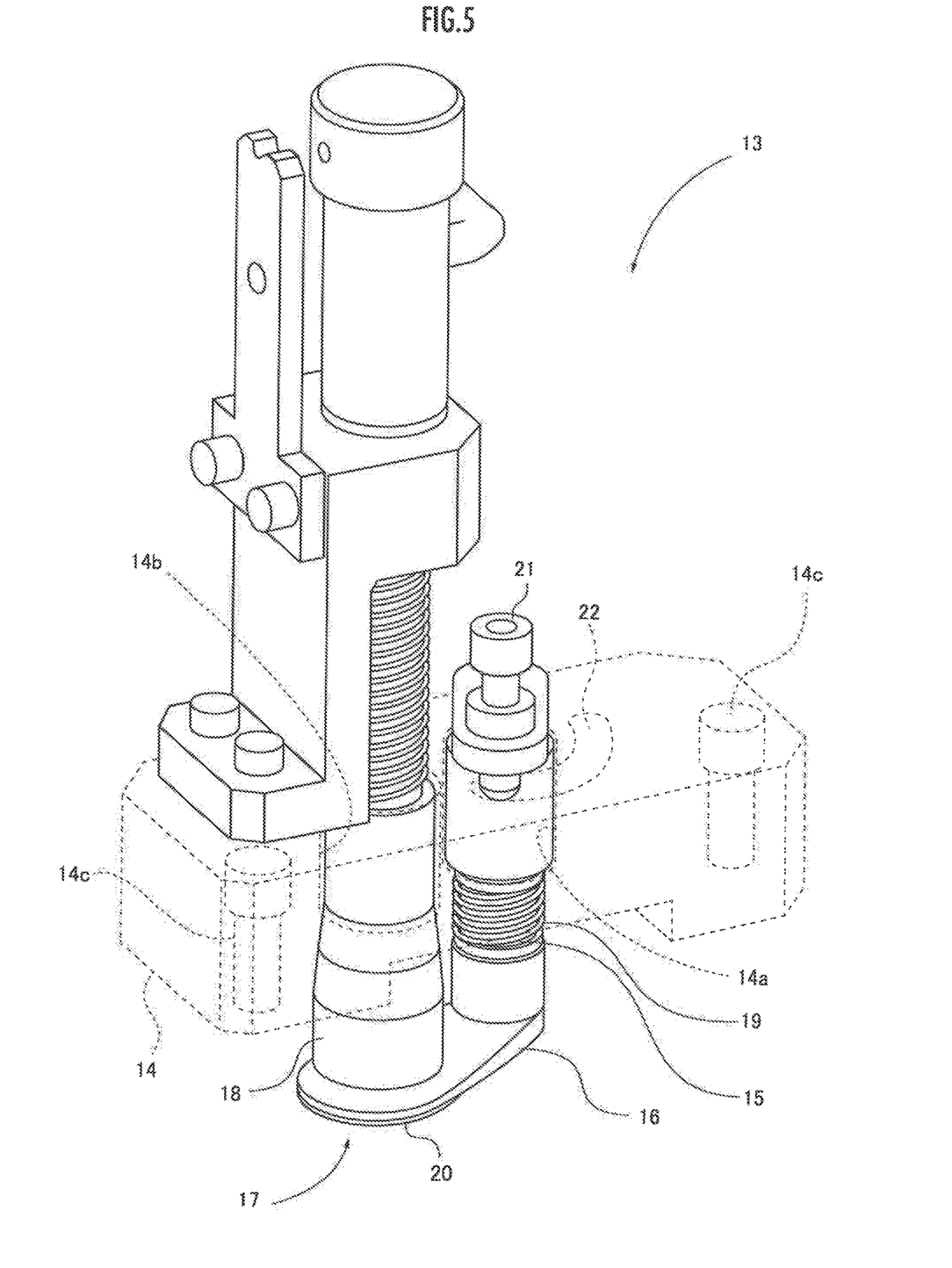
FIG. 5 is a perspective view illustrating a wastegate sealing jig of the first embodiment.
Figure 6:
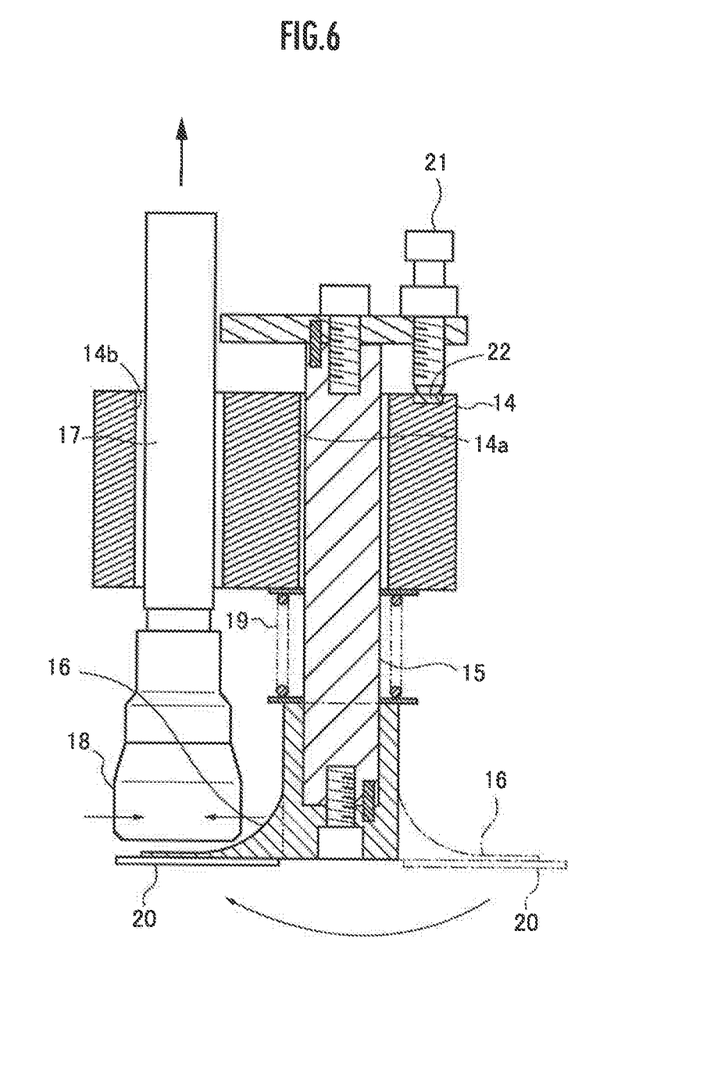
FIG. 6 is an explanatory diagram schematically illustrating a cross section of the wastegate sealing jig of the first embodiment.

In the present embodiment, a wastegate sealing jig 13 is used so that the wastegate 5 can be properly sealed, as illustrated in a perspective view of FIG. 5 and a cross-sectional view of FIG. 6. The wastegate sealing jig 13 includes a rectangular parallelepiped base 14 which has two first and second insertion holes 14*a*, 14*b*, a protrusion 15 which is inserted into the first insertion hole 14*a* to be capable of freely extending and retracting with respect to the base 14, and is attached to the base 14, and a fin-shaped valve member 16 which is provided at a distal end of the protrusion 15, and a cylindrical turbine hole sealing member 17 which is inserted into the second insertion hole 14*b*.

The fin-shaped valve member 16 extends in a direction perpendicular to an axial direction of the protrusion 15, and has a distal end formed in an arc shape, with the width of the valve member 16 gradually increasing toward the distal end from the protrusion 15 side. The valve member 16 has a surface which is opposite a surface covering the wastegate 5 and is inclined so that the thickness of the valve member 16 is gradually reduced toward the distal end from the protrusion 15 side.

A sealing member 20 made of a urethane rubber or a silicone rubber is stuck to the surface facing the wastegate 5 of the valve member 16.

The turbine hole sealing member 17 is provided to the base 14 to capable of freely extending and retracting so that the distal end thereof can be inserted into the turbine hole 12. A pneumatic chuck 18 (air picker) is provided at the distal end of the turbine hole sealing member 17. An air supply and discharge passage (not illustrated) is provided to the turbine hole sealing member 17 so that air can be supplied to the pneumatic chuck 18. When the air is supplied to the pneumatic chuck 18 through the air supply and discharge passage, the pneumatic chuck 18 is expanded, thereby capable of closing the turbine hole 12. When the air is discharged through the air supply and discharge passage, the pneumatic chuck 18 is deflated, thereby releasing the sealing of the turbine hole 12.

Figure 7:
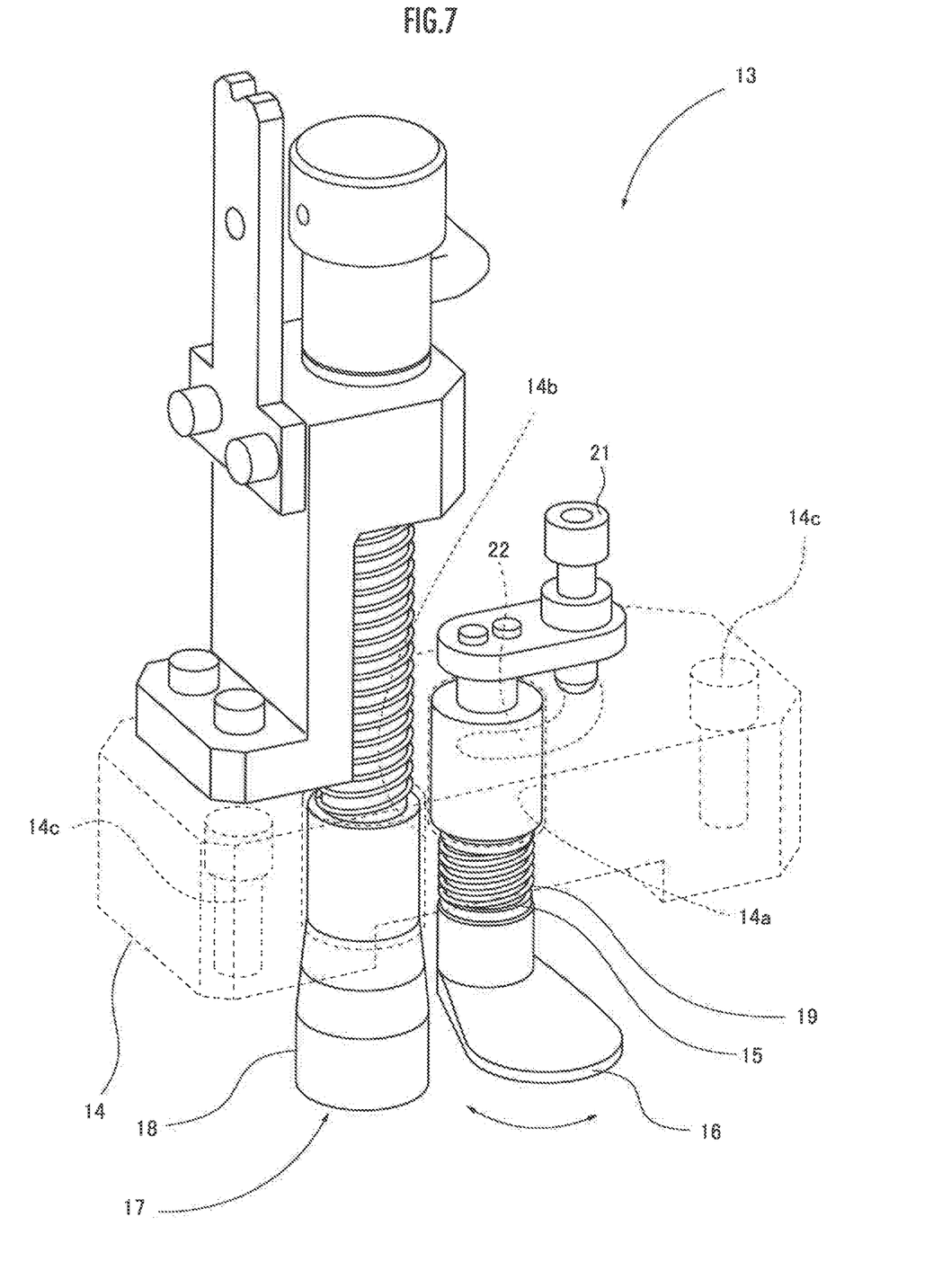
FIG. 7 is a perspective view illustrating a state in which a valve member of the wastegate sealing jig of the first embodiment is turned.
Figure 8:
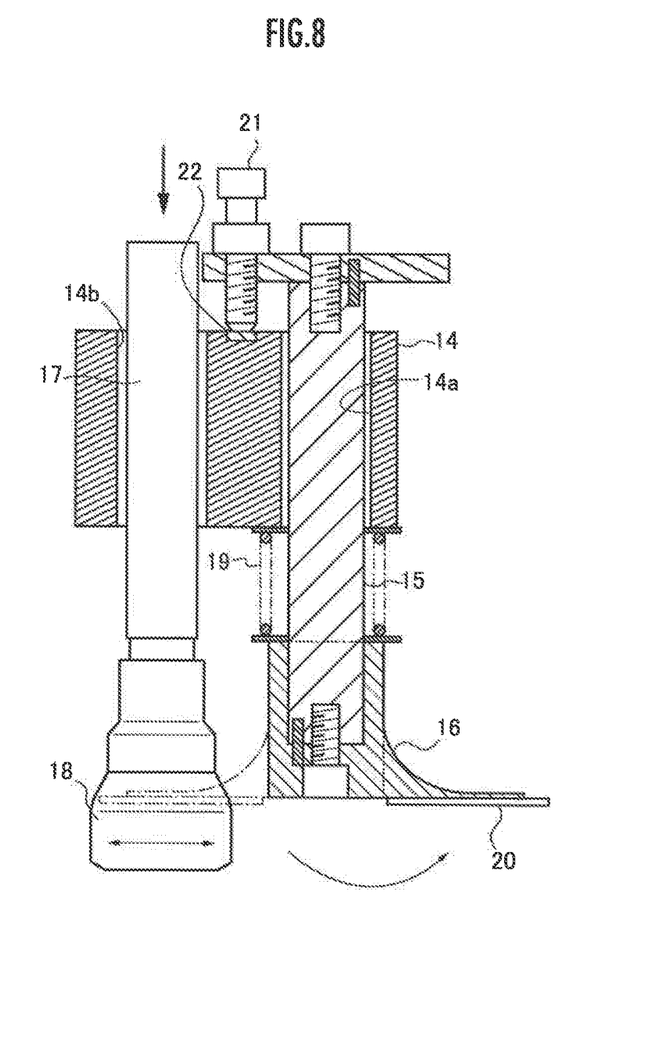
FIG. 8 is an explanatory diagram schematically illustrating a cross section of a state in which the valve member of the wastegate sealing jig of the first embodiment is turned.
Figure 9:
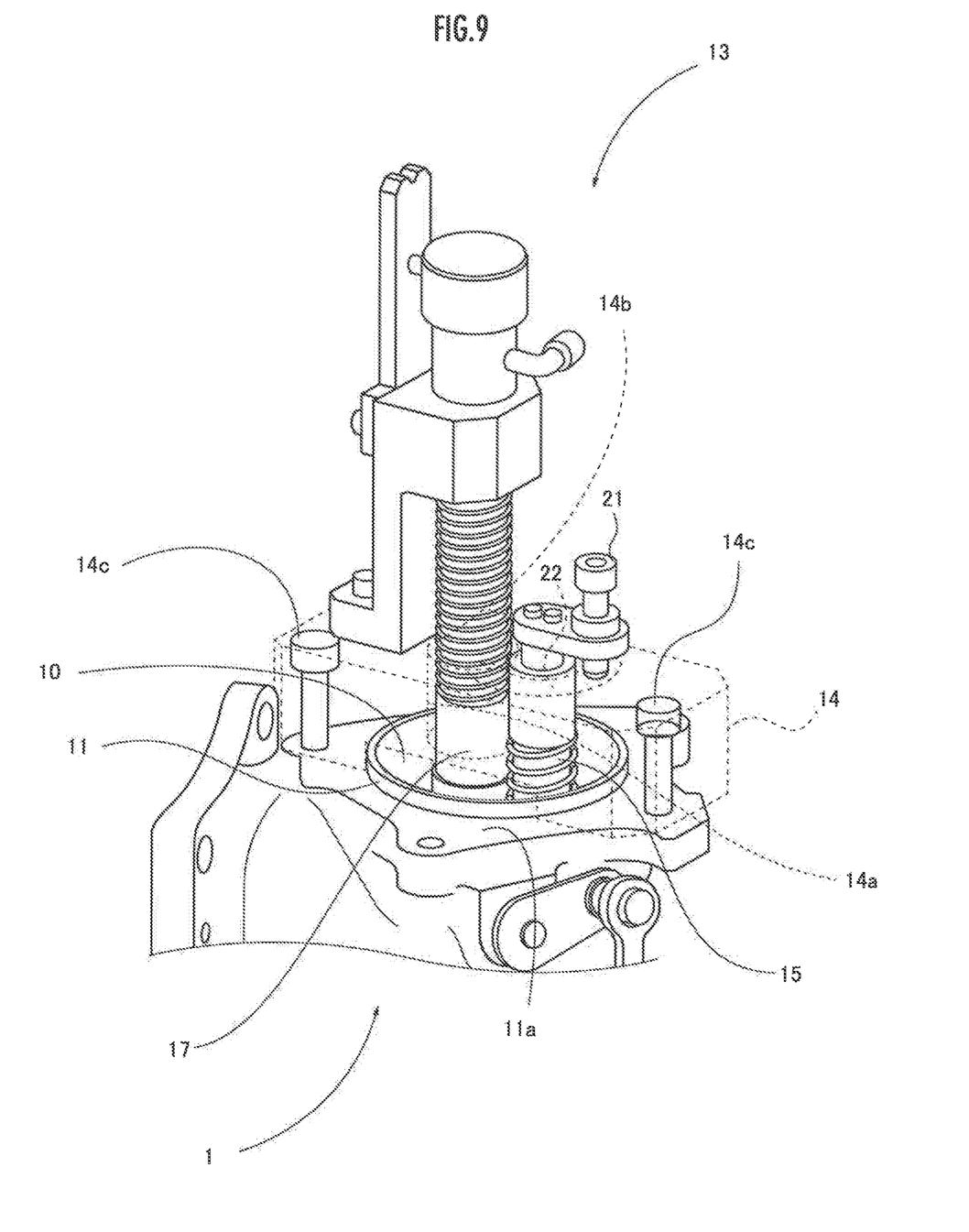
FIG. 9 is a perspective view illustrating a state in which the wastegate sealing jig of the first embodiment is fixed to a turbocharger.

The protrusion 15 is integrally and rotatably mounted to the valve member 16. The fin-shaped distal end of the valve member 16 is swingable outside of the advancing and retracting projection space which is a motion track in the advancing and retracting direction of the turbine hole sealing member 17, from a position forward of the turbine hole sealing member 17 in a state in which the turbine hole sealing member 17 is retracted, as illustrated in a perspective view of FIG. 7 and a cross-sectional view of FIG. 8, FIG. 9 is a perspective view illustrating a state in which the wastegate sealing jig 13 of the present embodiment is attached to the exhaust portion 11. As is clear from FIG. 9, to attach the wastegate sealing jig 13 to the exhaust portion 11, the bolt fixing holes 14*c* are provided in the base 14 of the wastegate sealing jig 13, corresponding to the positions of the bolt holes 11*b* which are provided in a flange 11*a* of the exhaust portion 11 to connect a catalytic device, a muffler, and the like, so that the wastegate sealing jig 13 is fixed to the exhaust portion 11 using the bolt holes 11*b*. As a result, the wastegate sealing jig 13 can be fixed to the exhaust portion 11 in a stable state, without providing the bolt holes 11*b* only for attaching the wastegate sealing jig 13 in the exhaust portion 11.

Note that, although an example is shown in which the wastegate sealing jig 13 is fixed using the bolt fixing holes 14*c*, as a method of fixing the wastegate sealing jig 13, the method of fixing the wastegate sealing jig is not limited to this, and for example, the wastegate sealing jig may be positioned and fixed to the exhaust portion 11 using positioning pins, or the like after being attached to an external device such as a robot.

Figure 10A:
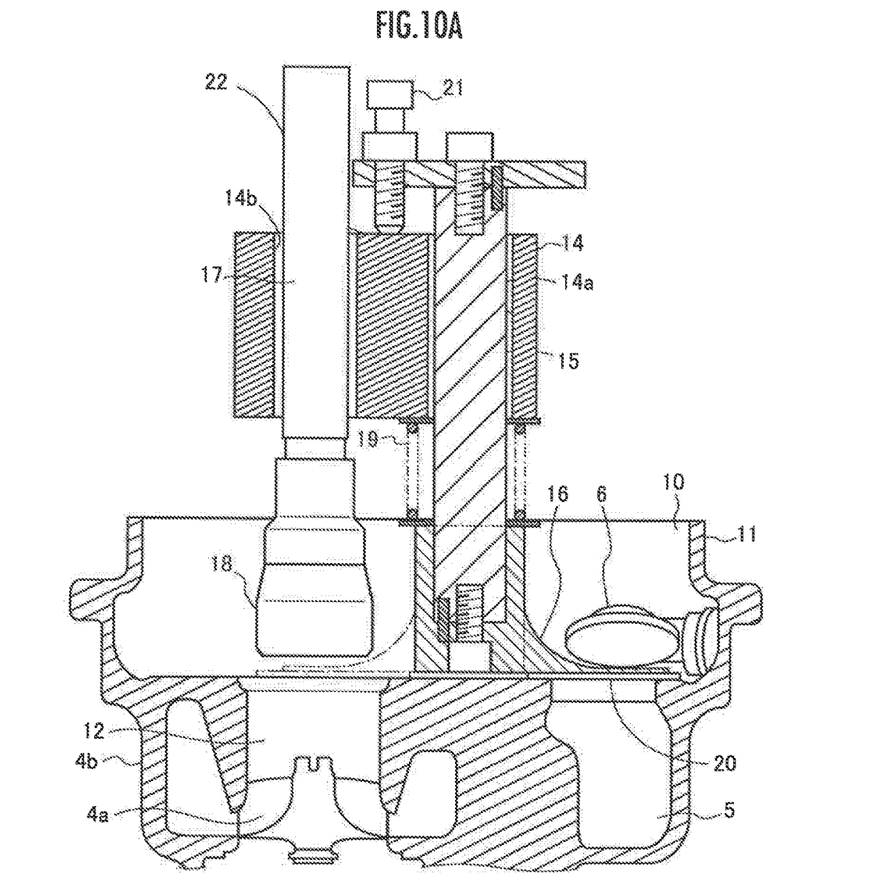
FIG. 10A is a cross-sectional view schematically illustrating a state in which the wastegate is sealed by the valve member of the first embodiment.
Figure 10B:
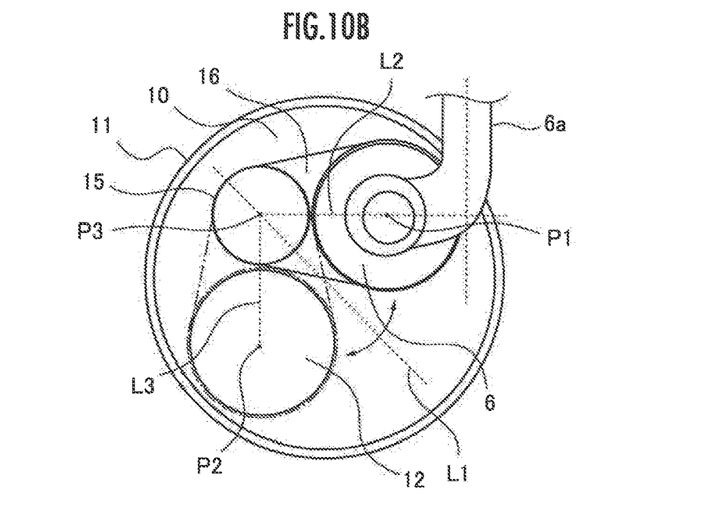
FIG. 10B is an explanatory diagram schematically illustrating an exhaust opening as seen from the rotation axis line direction of the valve member of the first embodiment.

FIG. 10A and FIG. 10B each are an explanatory diagram schematically illustrating a state in which the wastegate sealing jig 13 of the present embodiment is attached to the exhaust portion 11. As illustrated in FIG. 10A and FIG. 10B, to attach the wastegate sealing jig 13 of the present embodiment to the exhaust portion 11, firstly, the turbine hole sealing member 17 is moved to a retracted position. The distal end of a fin portion of the valve member 16 is positioned on the distal end side of the turbine hole sealing member 17 so that the distal ends of the turbine hole sealing member 17 and the valve member 16 overlap with each other in the axial direction of the turbine hole sealing member 17. Thus, even when the opening area of the exhaust opening 10 is small, the valve member 16 and the turbine hole sealing member 17 can be easily inserted into the exhaust opening 10 so as to avoid the wastegate valve 6.

The bolts are screw-fitted to the bolt holes 11*b* in the exhaust portion 11 to fix the base 14 to the exhaust portion 11, and the valve member 16 is turned in a state in which the wastegate valve 6 is opened, to be inserted between the wastegate 5 and the wastegate valve 6. Then, the valve member 16 is firmly pressed against an open end on an exhaust side of the wastegate 5 by a pressing mechanism 19 such as a coil spring, or an air pressure supply mechanism, to directly seal the wastegate 5.

Figure 11:
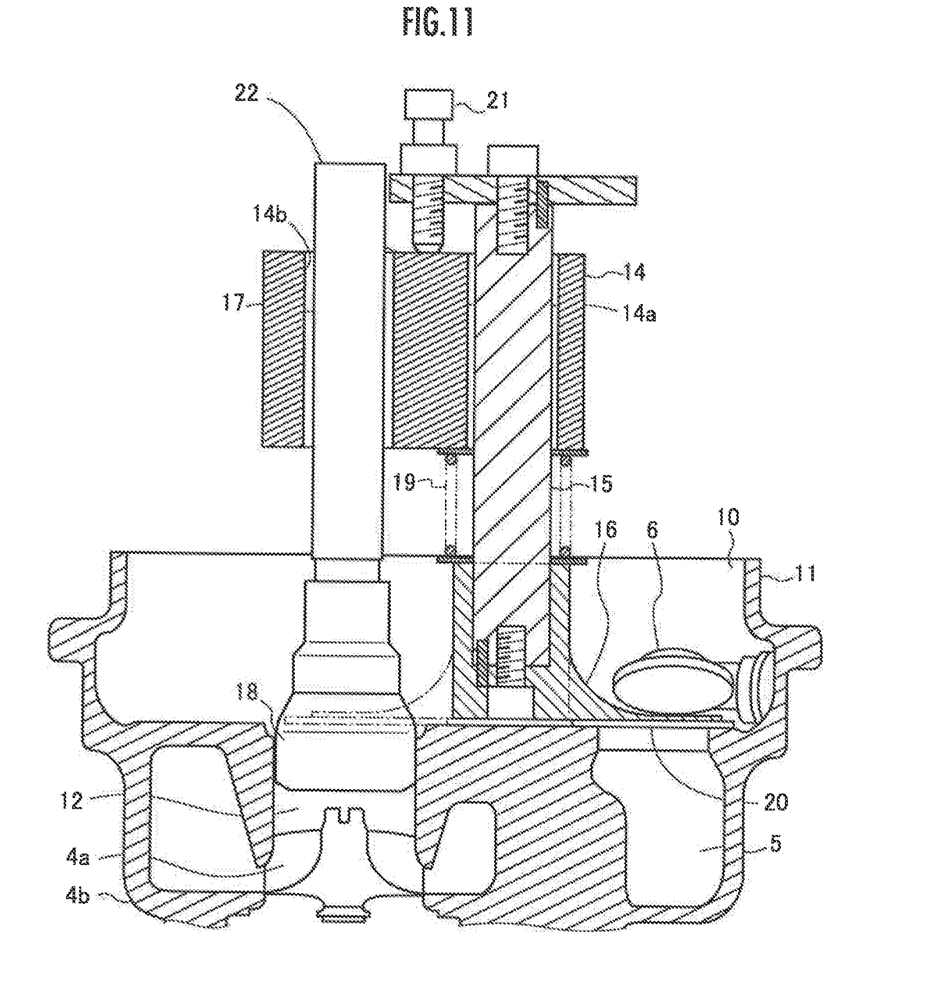
FIG. 11 is a cross-sectional view schematically illustrating a state in which a turbine hole is sealed by a turbine hole sealing member of the first embodiment.

As illustrated in FIG. 11, the turbine hole sealing member 17 is extended to insert the pneumatic chuck 18 into the turbine hole 12. The air is supplied to the pneumatic chuck 18, so that the expanded pneumatic chuck 18 seals the turbine hole 12. Note that, instead of the pneumatic chuck 18, an annular elastic body such as an O-ring having an outer diameter smaller than an inner diameter of the turbine hole 12 may be arranged in an outer peripheral surface of the distal end of the turbine hole sealing member 17, to insert the turbine hole sealing member 17 into the turbine hole 12, is crushed from the axial direction to increase the diameter of the annular elastic body, and is pressed against an inner peripheral surface of the turbine hole 12, resulting in the turbine hole 12 being sealed.

As is clear from FIG. 10B, the rotation axis line of the protrusion 15 is positioned to pass throw a bisector L1 of a line segment connecting a first center point P1 which is a center of the open end on the exhaust side of the wastegate 5 and a second center point P2 which is a center of the open end on the exhaust side of the turbine hole 12. Also, the rotation axis line of the protrusion 15 is positioned at an intersection point P3 between a first virtual straight line L2 and a second virtual straight line L3, the first virtual straight line L2 being perpendicular to the axis line of the opening and closing rotation shaft 6a of the wastegate valve 6 and passing through the first center point P1 being a center of the open end on the exhaust side of the wastegate 5, and the second virtual straight line L3 being perpendicular to the first virtual straight line L2 and being a center of the open end on the exhaust side of the turbine hole 12.

Figure 12:
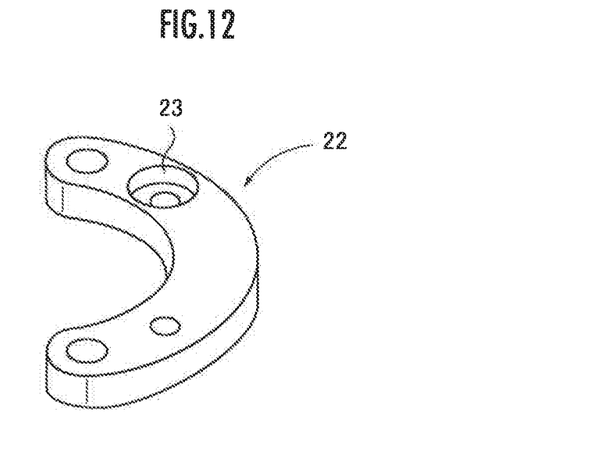
FIG. 12 is an explanatory diagram illustrating an extension and retraction restricting member of the first embodiment.

An operation lever 21 is provided on a top end of the protrusion 15 to rotate the protrusion 15. An extension and retraction restricting member 22 is fixed to the base 14, the extension and retraction restricting member 22 being formed in an arc shape along a rotation track when the operation lever 21 is rotated and coming into contact with the distal end of the operation lever 21.

As illustrated in FIG. 12, the extension and retraction restricting member 22 is provided with a recess 23 so that the protrusion 15 is positioned to an extended position to press the sealing member 20 against the wastegate 5 by the pressing mechanism 19 constituted by a spring, when the operation lever 21 is rotated until the valve member 16 reaches a position immediately above the wastegate 5. The operation lever 21 is fitted into the recess 23 so that the protrusion 15 is extended by a biasing force of the pressing mechanism 19 and the valve member 16 is pressed against the sealing member 20 to seal the wastegate 5.

According to the wastegate sealing jig 13 of the present embodiment, the wastegate 5 is directly sealed by the valve member 16, thereby capable of appropriately suppressing the leakage from the gap between the wastegate 5 and the opening and closing rotation shaft 6a for opening and closing the wastegate valve 6.

After the valve member 16 is inserted between the wastegate 5 and the wastegate valve 6, the protrusion 15 can press the valve member 16 against the wastegate 5, so that the valve member 16 can firmly seal the wastegate 5.

The turbine hole sealing member 17 is provided to directly seal the turbine hole 12, thereby capable of simplifying the structure of the wastegate sealing jig 13 without closing the exhaust opening 10 and sealing a gap in a portion for operating the valve member 16.

The protrusion 15 can be inserted into the exhaust opening 10 in a state in which the valve member 16 and the turbine hole sealing member 17 overlap with each other in the axial direction of the turbine hole sealing member 17. Thus, even if the space in the exhaust opening 10 is relatively narrow, the waste gate sealing jig 13 of the present embodiment can be attached to the exhaust portion 11 so that the wastegate 5 is properly sealed.

In the present embodiment, the base 14 is configured so that the rotation axis line of the protrusion 15 is positioned on the bisector L1 of a line segment connecting the opening center point P1 on the exhaust side of the wastegate 5 and the opening center point P2 on the exhaust side of the turbine hole 12 when the base 14 is fixed to the exhaust opening 10.

Here, if the base 14 is not configured so that the rotation axis line of the protrusion 15 is positioned on the above-described bisector, there is the possibility that the wastegate 5 cannot be covered even if the valve member 16 positioned at the distal end of the turbine hole sealing member 17 is turned unless the diameter of the valve member 16, or the like is increased. However, it is assumed that excessively increasing the valve member 16 makes it difficult to insert the wastegate sealing jig 13 into the exhaust opening 10 even if the valve member 16 is positioned at the distal end of the turbine hole sealing member 17.

As in the present embodiment, the base 14 is configured so that the rotation axis line is positioned on the bisector, so that the wastegate 5 can be firmly sealed even if the valve member 16 is made necessary minimum.

Note that the present embodiment has been described on the assumption that after the wastegate 5 is sealed by the valve member 16, the turbine hole 12 is sealed by the turbine hole sealing member 17. However, the wastegate sealing jig 13 of the present invention is not limited to this. For example, after the valve member 16 is turned, the wastegate 5 may be sealed by the valve member 16 after the turbine hole 12 is sealed by the turbine hole sealing member 17. Thus, the rotation axis line of the valve member 16 can be prevented from being tilted due to a pressing reaction force, when the valve member 16 is pressed against the wastegate 5.

Figure 13:
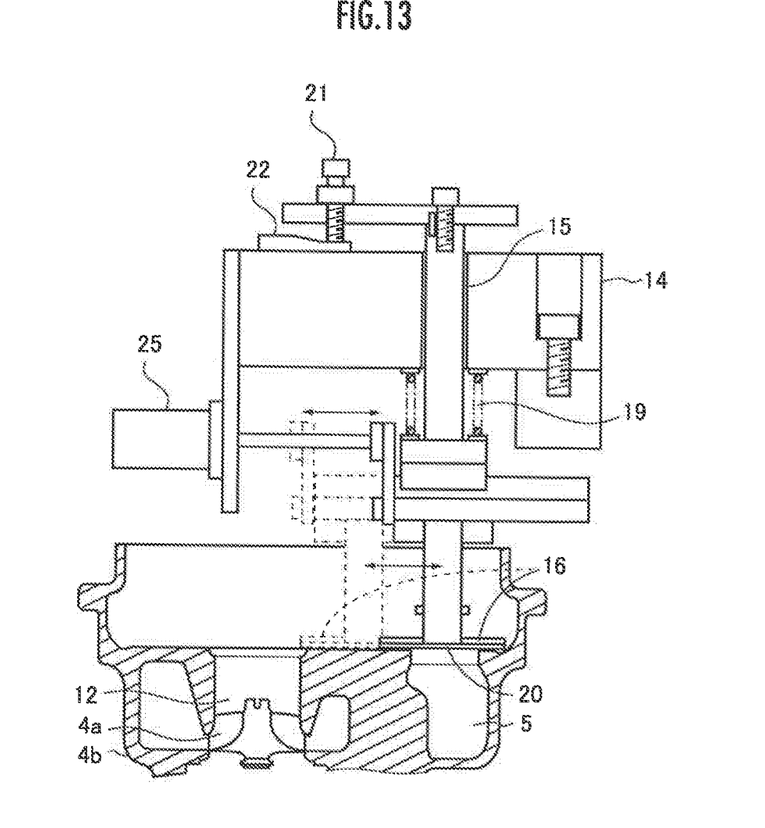
FIG. 13 is a cross-sectional view schematically illustrating a sliding wastegate sealing jig of a second embodiment.

The present embodiment has been described on the assumption that the valve member 16 is turned to seal the wastegate 5. However, the operation of the valve member of the present invention is not limited to this. For example, as illustrated in FIG. 13 as a second embodiment, the wastegate 5 may be sealed by sliding the valve member 16 by an actuator 25 such as an air cylinder in the lateral direction, and as illustrated in FIG. 14 as a third embodiment, the valve member may be moved toward a space between the wastegate 5 and the wastegate valve 6 from an obliquely upward side by a cam mechanism 24 to seal the wastegate 5.

Figure 14:
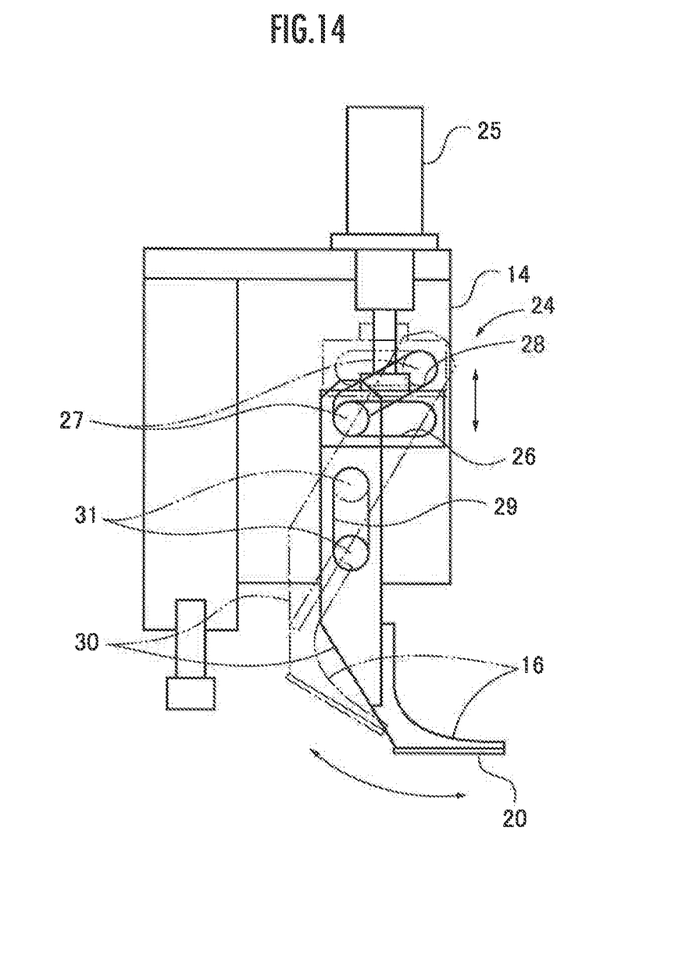
FIG. 14 is a cross-sectional view schematically illustrating a cam-driven wastegate sealing jig of a third embodiment.

The cam mechanism 24 of the third embodiment illustrated in FIG. 14 includes a lateral guide groove 26 which is fixed to a distal end of the actuator 25 being retractable in the vertical direction, and guides in the lateral direction, a first pin 27 which is guided by the lateral guide groove 26, and is fixed to an arm member 30, an oblique guide groove 28 which is formed in a member fixed to the base 14 and guides the first pin 27 in the oblique direction, a vertical guide groove 29 which is formed in the member fixed to the base 14 and guides in the vertical direction, and a second pin 31 which is guided by the vertical guide groove 29, and is fixed to the arm member 30 whose bottom end is fixed to the valve member 16. The first pin 27 is fixed to the arm member 30 so as to be located at the top end of the arm member 30 being higher than the second pin 31.

According to the cam mechanism 24 in FIG. 14, the lateral guide groove 26 is extended and retracted by the actuator 25 in the vertical direction, so that the first pin 27 is moved along the lateral guide groove 26 and the oblique guide groove 28, and the second pin 31 is moved along the vertical guide groove 29. The first pin 27 and the second pin 31 are thus moved, so that the distal end of the arm member 30 is moved in the vertical direction while oscillating, thereby capable of sealing the wastegate 5 by the valve member 16.

What is claimed is:

1. A wastegate sealing jig, comprising:
a base which is fixable to an exhaust portion of a turbocharger, the turbocharger including the exhaust portion which forms an exhaust opening, the base including a wastegate, a wastegate valve capable of closing the wastegate by covering an open end on an exhaust side of the wastegate, an opening and closing rotation shaft which opens and closes the wastegate valve, and a turbine hole which discharges exhaust gas from a turbine chamber in which a turbine wheel is housed;
a protrusion which is provided in the base so as to extend toward the exhaust portion in a region excluding the wastegate; and
a valve member which is attached to a distal end of the protrusion,
wherein the wastegate is closed by the valve member by inserting the valve member between the wastegate and the wastegate valve of the turbocharger in a state in which the wastegate valve is opened.

2. The wastegate sealing jig according to claim 1, wherein the valve member is configured to be turnable with respect to the base around an extending direction of the protrusion as a rotation axis line, and is formed to extend in a direction perpendicular to an axial direction of the protrusion and to increase a width of the valve member from a protrusion side to a distal end, and
in a state the valve member is turned to be inserted between the wastegate and the wastegate valve of the turbocharger, the wastegate is closed by the valve member.

3. The wastegate sealing jig according to claim 1, wherein the protrusion is configured to be retractable with respect to the base toward the exhaust opening.

4. The wastegate sealing jig according to claim 1, wherein a turbine hole, which communicates with the turbine chamber in which the turbine is housed, is provided in the exhaust opening, and
a turbine hole sealing member which seals the turbine hole is provided in the base.

5. The wastegate sealing jig according to claim 4, wherein the turbine hole sealing member is configured to be retractable with respect to the base toward the turbine hole,
the valve member is configured to be turnable with respect to the base around an extending direction of the protrusion as a rotation axis line,
the valve member is positioned in a distal end direction of the turbine hole sealing member when the turbine hole sealing member is at a retracted position, and
to close the exhaust opening, the valve member is turned, and then the turbine hole sealing member is advanced to seal the turbine hole.

6. The wastegate sealing jig according to claim 5, wherein the base is configured so that the rotation axis line is positioned on a bisector of a line segment connecting an opening center on an exhaust side of the wastegate and an opening center on an exhaust side of the turbine hole when the exhaust opening is fixed to the base.

7. The wastegate sealing jig according to claim 5, wherein the valve member is configured so that a thickness thereof is gradually reduced with increasing distance from the rotation axis line; and
when the base is fixed to the exhaust opening,
the rotation axis line is positioned at an intersection point between,
a line segment which is perpendicular to an axis line of the opening and closing rotation shaft which swingably opens and closes the wastegate valve in a direction away from the wastegate, and which passes through an opening center on an exhaust side of the wastegate, and
a line segment being perpendicular to the line segment passing through the opening center on the exhaust side of the wastegate, and passes through the opening center on the exhaust side of the turbine hole.

8. The wastegate sealing jig according to claim 1, wherein the valve member is configured to be slidable in a direction perpendicular to an extending direction of the protrusion, and
the wastegate is sealed by the valve member in a state where the valve member is inserted between the wastegate and the wastegate valve of the turbocharger by sliding the valve member.

* * * * *